Figure 1:
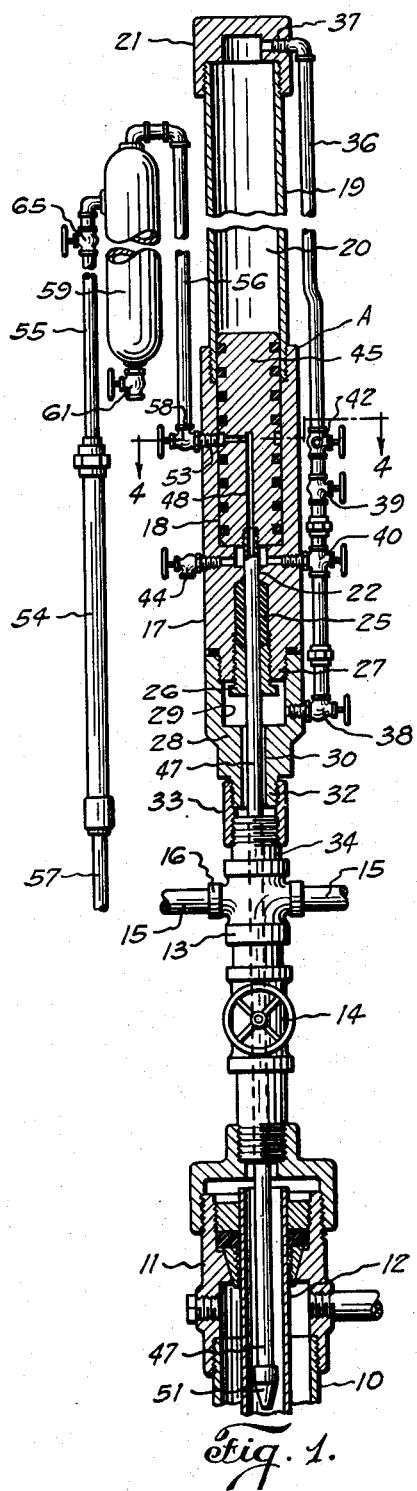

June 20, 1944. H. U. JARRETT 2,351,764
METHOD OF AND MEANS FOR OBTAINING AND MEASURING GASEOUS SAMPLES
Filed May 12, 1941 2 Sheets-Sheet 1

Inventor
Henry U. Jarrett
By Jack A. Ashley
Attorney

June 20, 1944. H. U. JARRETT 2,351,764
METHOD OF AND MEANS FOR OBTAINING AND MEASURING GASEOUS SAMPLES
Filed May 12, 1941 2 Sheets-Sheet 2

Inventor
Henry U. Jarrett
By Jack A. Ashley
Attorney

Patented June 20, 1944

2,351,764

UNITED STATES PATENT OFFICE 2,351,764

METHOD OF AND MEANS FOR OBTAINING AND MEASURING GASEOUS SAMPLES

Henry U. Jarrett, Palestine, Tex., assignor of one-half to W. O. Whiteside, Longview, Tex.

Application May 12, 1941, Serial No. 393,086

9 Claims. (Cl. 73—21)

This invention relates to new and useful improvements in methods of and means for obtaining and measuring gaseous samples.

One object of the invention is to provide an improved method of obtaining gaseous samples from gas and/or high pressure oil wells and determining the gas/oil ratio or percentage of liquefiable hydrocarbons present in said samples.

An important object of the invention is to provide an improved method of obtaining a representative sample of the gaseous well fluids discharged from a well under normal flowing conditions and accurately measuring the liquid and/or liquefiable hydrocarbon content of said sample to determine the gas/oil ratio thereof.

Another object of the invention is to provide an improved fluid sampling method which includes the preliminary step of settling out the hydrocarbons which are liquefied or readily liquefiable prior to the conventional measurement of the liquefiable-hylrocarbon content of the sample, whereby a more accurate measurement is obtained.

A particular object of the invention is to provide an improved method, of the character described, wherein the pressure of the well fluids is utilized as the operating medium for actuating the sample obtaining means.

A further object of the invention is to provide an improved fluid sampling method which includes separating the liquefied or readily liquefiable hydrocarbons from the fluid sample, then passing said fluid sample through an absorbent to separate the liquefiable hydrocarbons from the non-liquefiable hydrocarbons, the preliminary separation of such hydrocarbons resulting in the prevention of excessive saturation of the absorbent and the consequent loss of said hydrocarbons due to the excessiveness of the saturation, whereby the percentage of liquefiable hydrocarbons present in the sample may be more accurately ascertained.

Still another object of the invention is to provide improved fluid sampling means which is adapted to be actuated solely by the energy of the well fluid pressure within the well being tested and which is adapted to be readily moved from well to well, whereby elimination of auxiliary operating means and a considerable saving of time are effected not only in running the tests but also in the installation and removal of the sampling means.

A still further object of the invention is to provide an improved apparatus for obtaining and testing fluid samples from a flowing well which includes a pressure-responsive member adapted to be actuated by the pressure of the well fluids for operating the fluid-sampling tube and which also includes a separator or trapping the liquids in suspension to prevent undue saturation of the absorbent employed in measuring the percentage of liquefiable hydrocarbons present in the fluid samples, whereby an efficient and economical measurement of the gas and oil ratio is had.

The construction designed to carry out the invention will be hereinafter described together with other features of the invention.

Figure 4:
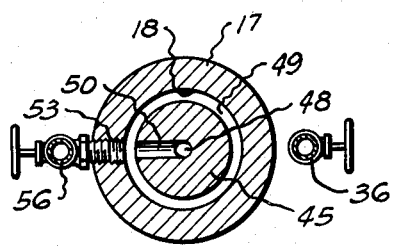
Figure 6:
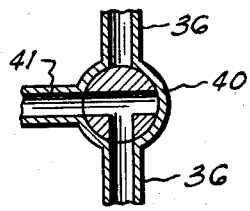
Figure 7:
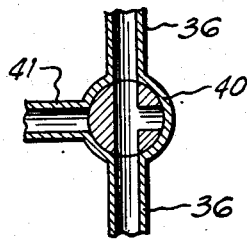
Figures 2, 3, 5:
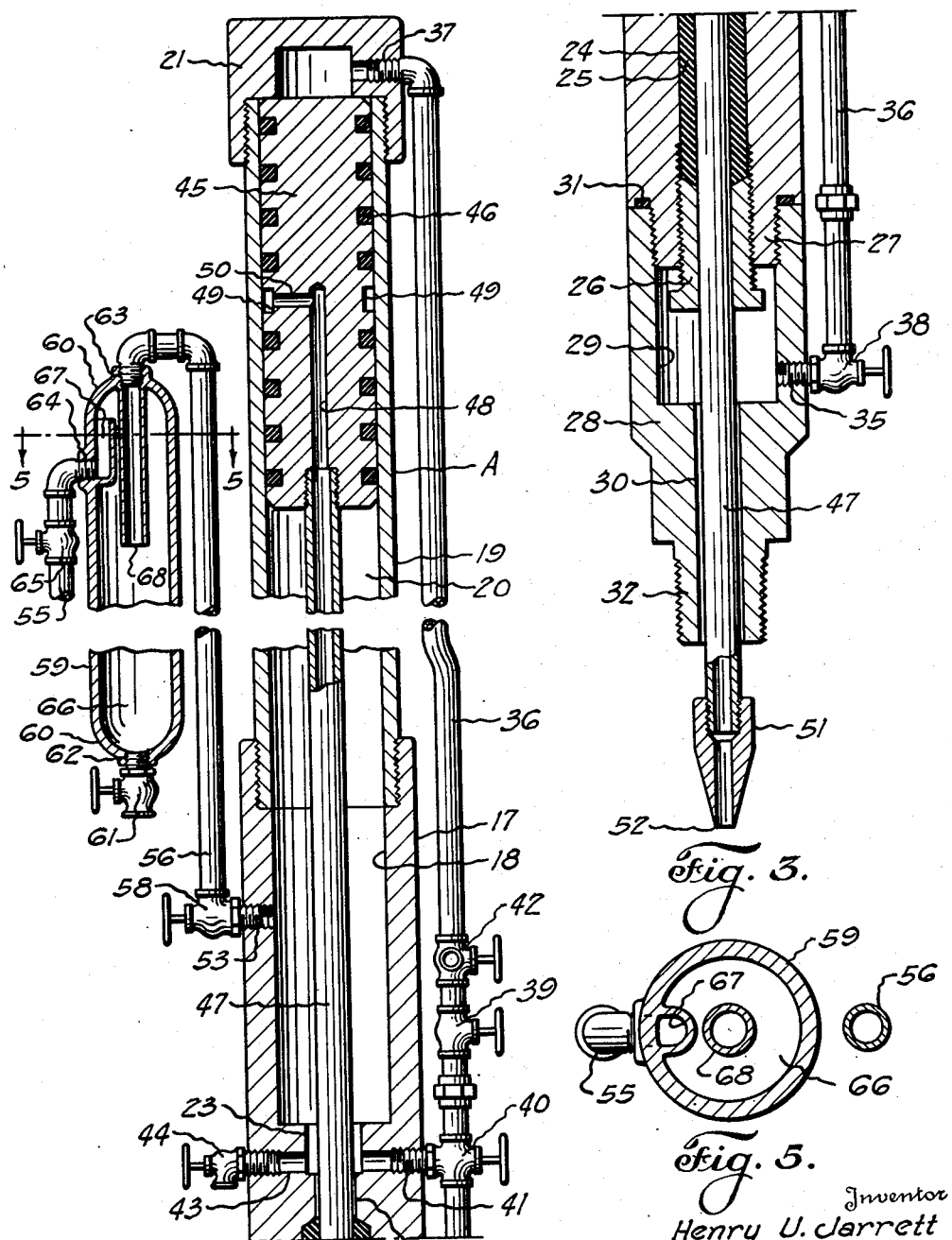

The invention will be more readily understood from a reading of the following specification and by reference to the accompanying drawings, and as an example of the invention is shown, and wherein:

Figure 1 is a view, partly in elevation and partly in section, of an apparatus constructed in accordance with the invention and mounted upon the flow connections of a well, Figure 2 is an enlarged, transverse, vertical sectional view of the upper portion of the apparatus, Figure 3 is a view, similar to Figure 2, of the lower portion of the apparatus, Figure 4 is a horizontal, cross-sectional view, taken on the line 4—4 of Figure 1, Figure 5 is a horizontal, cross-sectional view, taken on the line 5—5 of Figure 2, Figure 6 is a schematic view of one of the two-way valves, and Figure 7 is a view, similar to Figure 6, of the valve in its opposite or reverse position.

In the drawings, the numeral 10 designates a well casing having the usual casing head 11 mounted on its upper end for supporting a well tubing 12 axially within the same. A flow connection or cross 13 is disposed above the casing head, while a gate valve 14 is interposed between the cross and the casing head. The flow cross communicates with the bore of the tubing 12 and has the customary flow pipes 15 connected in its lateral outlet ports 16. The above elements constitute the conventional hook-up or control assembly of a flowing well and form no part of the present invention.

A fluid sampling apparatus A is adapted to be mounted above the flow cross 13 and includes an elongate, cylindrical body or member 17 having an axial bore 18 formed in its upper end. A tubular sleeve 19, having an internal diameter substantially equal to the diameter of the bore 18, is screw-threaded into the upper end of the body 17 so as to provide an elongate cylinder 20, the upper end of which is closed by a cap member 21. An axial counterbore 22 is disposed within the lower portion of the body 17 below and in communication with the bore 18 and has its extreme upper end enlarged to provide an annular recess or chamber 23. The lower portion of the counterbore is also enlarged to form a stuffing box or packing chamber 24 for receiving a cylindrical packing member 25, of rubber, Neoprene or other suitable resilient material, which is confined therein by a screw-threaded gland or follower 26. An externally screw-threaded nipple 27 depends axially from the lower end of the body 17 and is threaded within the upper end of a box 28, the bore 29 of which has its lower end reduced to provide a counterbore 30. The joint between the abutting surfaces of the body and box is preferably sealed off by a suitable packing ring 31.

For detachably connecting the sampling apparatus A to the flow cross 13, the lower end 32 of the box 28 is reduced and externally screw-threaded, whereby it may be readily connected with a suitable coupling collar 33 which is fastened by a nipple or short sleeve 34 to the upstanding flange of said flow cross. A lateral, screw-threaded port or opening 35 (Figure 3), arranged to receive the lower end of a pipe or tube 36 which extends longitudinally and externally of the apparatus A, is formed in the wall of the box 28. The upper end of the pipe 36 is screw-threaded within a similar port 37 provided in the side wall of the cap member 21, whereby said pipe establishes communication between the upper end of the cylinder 20 and the bore 29 of the box. Suitable manual control valves 38 and 39 are mounted in the pipe 36, one valve being disposed adjacent the port 35 and the other valve positioned intermediate the ends of said pipe. Between the lower valve 38 and the upper valve 39, the pipe communicates with the annular recess or chamber 23 of the body 17 by means of a two-way valve 40 which is screw-threaded in a port 41 extending laterally through the wall of said body. When the valve 40 is in one position as shown in Figure 6, communication is established between the lower portion of the pipe 36 and the recess 23 and shuts off the upper portion of said pipe. In its other position, the valve 40 closes the port 41 and permits the lower portion of the pipe to communicate with the upper portion thereof (Figure 7). A similar two-way valve 42 is mounted in the pipe 36 above the valve 39 and has its third branch communicating with the atmosphere, whereby the upper portion of said pipe may be brought into communication with the lower portion thereof or with the atmosphere. Diametrically opposite the port 41 which opens into the annular recess 23, a complementary port or outlet opening 43 is provided and is arranged to receive a suitable control valve 44.

A piston or plunger 45, having a plurality of sealing rings 46 mounted in grooves on its external surface, is slidably disposed within the cylinder 20 and has an elongate, cylindrical sampling tube 47 depending axially therefrom. Due to the provision of the recess 23 and cap member 21, which form internal, annular shoulders at the ends of the cylinder, upper and lower stops for the piston 45 are provided. The tube 47 is preferably screwthreaded into the lower end of the piston 45 and communicates with a small axial bore 48 formed within the lower portion of said piston. Communication between the upper end of the bore 48 and an annular groove or recess 49, formed in the exterior of the piston at its intermediate portion, is established by a radial duct 50 (Figure 4). As shown in Figure 1, the tube 47 is of sufficient length to extend below the flow connection of the casing head when the piston is in its lowermost position. An enlarged hollow tip or head 51, having its lower, external surface bevelled to provide an annular knife-edge 52 on its lower end, is screw-threaded on the lower extremity of the tube. The external diameter of the tube is substantially equal to the diameters of the bore 22 of the body 17 and the bore of the packing gland nut 26, whereby said tube has a snug sliding fit within said bores and has its external surface sealed off by the packing member 25. The tube also extends axially through the bore 29 and counterbore 30 of the box 28, the counterbore being of a slightly greater diameter than said tube so as to provide an annular flow space exteriorly of the tube between the bore of the well tubing and said bore 29. When the tube and piston are in their lowermost positions, the external annular groove 49 of said piston is in registration and communicates with a discharge opening or port 53 formed in the cylinder wall as shown in Figure 1.

Prior to the connection of the sampling apparatus A to the flow cross 13, the piston 45 and tube 47 are preferably in their uppermost positions with the upper end of said piston engaging the upper stop formed by the cap member 21 and the tip 51 of said tube is in close proximity to the lower end of the box 28. After coupling the apparatus to the flow cross, the gate valve 14 and control valves 38 and 39 are opened to permit the well fluids to flow from the tubing, through the counterbore 30 and bore 29 of the box 28, through the pipe 36 and then into the upper end of the cylinder 20, whereby the pressure of said well fluids may be exerted against the upper end of the piston. At this time, the valves 40 and 42 are in a position establishing communication therethrough and are closed off from the port 41 and atmosphere, respectively (Figure 7), while the valve 44 is preferably opened to permit the escape of any pressure trapped within the cylinder below the piston. The pressure of the well fluids exerted against the upper end of the piston will force said piston and the tube downwardly until the lower end of the piston strikes the lower stop or shoulder of the cylinder. When the piston and tube have reached their lowermost positions, it is preferable to close the valves 38 and 44 as the pressure of the well fluids trapped within the cylinder above said piston is sufficient to maintain the same in such position. With the piston in this position, the lower end of the tube will be below the connection of the casing head 11 as well as a considerable distance below the outlet ports 15 of the flow cross as shown in Figure 1. Also, the annular groove 49 of the piston will be in registration with the discharge opening 53, whereby fluid entering the bore of the tube will be conducted through the bore 48 and duct 50 of said piston into said groove and outwardly through said opening.

To elevate the piston and tube, the valve 38 is again opened and the valves 40 and 42 are moved to their non-communicating or second positions (Figure 6) so as to communicate with the port 41 and atmosphere, respectively. Thus, the well fluids within the pipe 36 will be conducted by the valve 40, port 41 and recess 23 to the lower end of the cylinder. Since the upper portion of the pipe 36 is in communication with the atmosphere due to the position of the valve 42, the well fluids within the cylinder above the piston are exhausted to permit the free upward movement of the piston and tube. The valve 38 is then closed and the piston and tube left in their uppermost positions until it is desired to obtain another sample of the well fluids or until the apparatus is removed to another well. In the latter event, the gate valve 14 is closed prior to disconnection and the valve 44 is opened to permit the escape of the well fluids trapped within the cylinder below the piston.

For determining the liquefiable hydrocarbon content or gas/oil ratio of a sample of the well fluids, an absorption tube 54 communicates with the discharge opening 53 of the cylinder by the means of pipes or conductors 55 and 56. The tube 54 is filled with charcoal, or any other suitable absorbent, and has its lower or outer end connected by a pipe 57 to a suitable meter (not shown) whereby the volume or quantity of the liquefiable hydrocarbons of the well fluid sample may be measured. The pipe 56 is connected to the opening 53 by a manual control valve 58 screw-threaded into said opening, said pipe preferably extending longitudinally of the body 17 and sleeve 19 and upwardly from said opening. Interposed between the adjacent ends of the pipes 55 and 56 and establishing communication therebetween is an upright, cylindrical tank or housing 59 having its top and bottom ends curved or rounded as designated by the numeral 60. A manual control valve 61 is screw-threaded into an axial opening 62 formed in the bottom of the housing, while a complementary opening 63 is provided in the top of said housing for receiving the upper or free end of the pipe 56. Communication between the pipe 55 and the interior of the housing 59 is provided by the upper end of said pipe engaging within a port 64 formed in the sidewall of said housing adjacent its top. The pipe 55 preferably depends from the port 64 so as to extend longitudinally of the housing and has a suitable hand valve 65 mounted therein.

As is clearly shown in Figure 2, the interior of the housing is hollow so as to provide a chamber 66 for receiving the well fluid sample discharged from the opening 53 of the cylinder 20 into the pipe 56. An arcuate trough 67 is disposed adjacent the port 64 for preventing the entrained liquids or readily liquefiable hydrocarbons of the sample from flowing through said port into the pipe 55 and absorption tube 54 and is preferably made integral with the inner surface of the chamber wall (Figure 5). For directing the well fluid sample as it enters the chamber 66 to the intermediate portion thereof, a short, tubular sleeve 68 depends axially from the top of the housing to a point below the trough 67 and forms a continuation of the pipe 56. Thus, the well fluid sample, conducted by the sampling tube 47, piston bore 48, duct 50 and groove 49 to the opening 53 of the cylinder 20, will be discharged into the intermediate portion of the chamber 66 by the pipe 56 and sleeve 68. Immediately upon entering the chamber, the lighter ends or non-liquefied hydrocarbons present in the fluid sample will rise and flow over the wall of the trough 67 into the pipe 55 and absorption tube 54, while the entrained liquids and readily liquefiable hydrocarbons will flow downwardly and settle to the bottom of said chamber by reason of their weight. Due to the enlarged area of the chamber, there will be a slight drop in the pressure and temperature of the fluid sample and a consequent condensation of a portion of the liquefiable hydrocarbons. The remaining liquids or liquefiable hydrocarbons will be trapped by the charcoal, or other absorbent, within the tube 54. Manifestly, the chamber 66 serves as a settling chamber or separator for trapping the major portion of the entrained liquids and/or readily liquefiable hydrocarbons, whereby a substantially liquid-free fluid sample is delivered to the absorption tube. By preventing the passage of an appreciable amount of free liquids and/or readily liquefiable hydrocarbons to the absorption tube, excessive saturation of the absorbent and by-pass of said liquids and/or hydrocarbons through said tube is eliminated.

From the foregoing, it is obvious the gas/oil ratio or liquefiable hydrocarbon content of the well fluid sample may be readily ascertained by combining the liquids and/or liquefied hydrocarbons trapped in the separating chamber and absorption tube and computing the percentage thereof.

When it is desired to obtain and measure a representative well fluid sample or samples, the sampling apparatus A is connected to the flow cross 13 of the well with the piston 45 and tube 47 in their uppermost positions (Figure 2). As has been hereinbefore fully described, the valves 38, 40, 39 and 42 are then manipulated so as to establish communication between the bore 29 of the box 28 and the upper end of the cylinder 20 by means of the pipe 36, while the valve 44 is opened to exhaust any pressure trapped within said cylinder below the piston. With the elements in the above position, the pressure of the well fluids will be exerted against the upper end of the piston and will force the same downwardly until its lower end engages the lower stop of the cylinder, whereby the annular groove 49 of said piston will be moved into registration with the discharge opening 53 and the tip 51 of the sampling tube will be disposed below the flow connection of the casing head 11. The valves 38 and 44 are then closed and the valves 58 and 65 opened to permit the well fluids to flow from the bore of the tubing, through the sampling tube, into the chamber 66 of the separator 59 and the absorption tube 54. Due to the provision of the annular knife-edge 52 of the tip 51 and the positioning of the same below the flow connections of the well control assembly, there is a substantially uninterrupted, representative flow of the well fluids into the sampling tube. After a suitable sample of the well fluids has been obtained, the valve 58 is closed to shut off the flow thereof to the separator 59.

The liquids trapped within the absorption tube 54 and the chamber 66 of the separator are then removed and combined so that the percentage thereof relative to the volume of the sample may be computed. In removing the liquids from the separator chamber, the valve 61 is opened to permit the same to drain therefrom. Due to the passage of the gaseous fluids and lighter hydrocarbons from the chamber into the absorption tube after the closing of the valve 58, the liquids within said chamber will be under atmospheric or sub-atmospheric pressure. It has been found that the opening of the valve 61 will admit air into the chamber and cause agitation of the liquids due to the lower pressure or slight vacuum thereabove, whereby said liquids will rise within said chamber and tend to flow into the trough 67 and out through the port 64. To overcome this difficulty, the sleeve 68 has been extended a sufficient distance below the trough to break up the agitation of the liquids so that the same will only rise to a predetermined point. Thus, the sleeve serves the two-fold purpose of directing the well fluids to the intermediate portion of the chamber and preventing undue agitation and the escape of the trapped or separated liquids.

In order to obtain another sample, it is only necessary to close the valve 61 and open the valve 58 so as to again admit the well fluids to the chamber 66 and the absorption tube 54. The apparatus A may be removed from the well by opening the valve 38 and reversing the position of the two-way valves 40 and 42, thereby establishing communication between the bore 29 of the box 28 and the lower end of the cylinder and permitting the well fluids trapped in said cylinder above the piston to escape to atmosphere. Since the pressure of the well fluids is exerted against the lower end of the piston, the same will be raised to its upper position as shown in Figure 2. When the piston is in this position, the tip 51 of the tube 47 will be immediately below the box 28 and the disconnection of the apparatus may be accomplished by uncoupling said box from the flow cross 13. The apparatus may then be moved to another well or stored for future use. By utilizing the pressure of the well fluids to actuate the piston, it is obvious that the necessity of auxiliary operating means for actuating the sampling tube is eliminated so as to provide a more economical and efficient mechanism.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of determining the liquefiable hydrocarbon content of the fluid discharged from a flowing well which includes, obtaining a representative sample of the well fluids from the well bore prior to the discharge of said fluids, separating the liquefied and readily liquefiable hydrocarbons from the sample, then passing the remainder of said sample through an absorbent to separate the liquefiable hydrocarbons from the remainder of the sample, and then combining the separated liquefied and liquefiable hydrocarbons and computing the percentage thereof.

2. An apparatus for obtaining a sample of fluid from a high pressure flowing well and separating its liquefiable hydrocarbon content including, means for obtaining a representative well fluid sample from the tubing of a flowing well below the flow connections thereof, means for settling out the liquefied hydrocarbons from the sample obtained, means for conducting said sample from the obtaining means to the settling means, and absorption means for receiving the remainder of the sample from said settling means and for trapping the liquefiable hydrocarbons therein whereby the recovered hydrocarbons may be combined and the percentage thereof computed.

3. An apparatus for obtaining a sample of fluid from a high pressure flowing well and separating its liquefiable hydrocarbon content including, means for obtaining a representative well fluid sample from the tubing of a flowing well below the flow connections thereof, a chamber having connection with the obtaining means for receiving the sample and settling out liquefied and readily liquefiable hydrocarbons, and an absorption tube communicating with the chamber for receiving the remainder of said sample and trapping the liquefiable hydrocarbons therein, whereby said hydrocarbons may be recovered from the tube and chamber to permit combining and computation of the percentage thereof.

4. A sampling apparatus for a flowing well having a flow control assembly mounted upon and in communication with its bore including, a tubular body adapted to be connected to the control assembly with its bore communicating with the bore of the well tubing and having a cylinder formed therein, the cylinder having a valve-controlled outlet, a piston member slidably mounted within said cylinder, a tube depending from the member through the lower end of the cylinder into the bore of the body and adapted to be lowered into and raised from the well tubing by said member for receiving a well fluid sample, means for sealing off between the tube and said body bore to prevent direct communication between said tubing and the cylinder, means for selectively conducting the well fluids to the upper and lower ends of said cylinder whereby the well fluids may be directed to either end of the cylinder to reciprocate the piston member and tube, and means for exhausting said well fluids from the upper and lower ends of said cylinder, said member having a passage therein communicating with said tube and closed off by the cylinder wall to prevent escape of the fluid sample, the passage of the member registering with the outlet of said cylinder only when said member is moved to its lower position for conducting said sample from said tube to said outlet.

5. A sampling apparatus for a flowing well having a flow control assembly upon and in communication with its bore including, a tubular body adapted to be connected to the control assembly so as to communicate with the bore of the well tubing and having a cylinder formed therein, the cylinder having a valve-controlled outlet, a piston member slidably mounted within said cylinder, a tube depending from the member through the lower end of the cylinder into the bore of the body and adapted to be lowered into and raised from the well tubing by said member for receiving a well fluid sample, means for sealing off between the tube and said body bore to prevent direct communication between the cylinder and tubing, means for establishing communication between said well tubing and the upper and lower ends of said cylinder, means for controlling the flow of well fluids through the communicating means, whereby well fluids may be directed to either end of the cylinder to reciprocate said piston member and tube, and means for exhausting said well fluids from the upper and lower ends of said cylinder to assist the reciprocation of the member and tube, said member having a passage therein communicating with said tube and closed off by the cylinder wall to prevent the escape of the fluid sample, the passage of the member registering with the outlet of the cylinder only when said member is moved to its lower position for conducting said sample from said tube to said outlet.

6. A sampling apparatus for a flowing well having a flow control assembly mounted upon and in communication with its bore including, a tubular body adapted to be connected to the control assembly so as to communicate with the well tubing and having a cylinder formed therein, the cylinder having a valve-controlled outlet, a piston member slidably mounted within the cylinder, a tube depending from the member and extending through the lower end of said cylinder into the bore of the body and adapted to be lowered into and raised from the bore of the tubing by said member for receiving a well fluid sample, means for sealing off between the tube and said body bore to prevent direct communication between the cylinder and tubing, a conduit for establishing communication between said tubing and the upper and lower ends of said cylinder, valves for controlling the flow of well fluids through the conduit, whereby the well fluids may be directed alternately to the opposite ends of the cylinder to reciprocate the piston member so as to raise and lower the tube, and means for releasing said well fluids from the upper and lower ends of the cylinder, said member having a passage therein communicating with said tube and closed off by the wall of said cylinder to prevent the fluid sample from escaping, the passage of the member registering with the outlet of the cylinder only when said member is moved to its lower position for conducting said sample from said tube to said outlet.

7. A sampling apparatus for a flowing well having a flow control assembly mounted upon and in communication with its bore including, a tubular body adapted to be connected to the control assembly so as to communicate with the well tubing and having a cylinder formed therein, the cylinder having a valve controlled outlet, a piston member slidably mounted within said cylinder, a tube depending from the member and projecting through the lower end of the cylinder into the bore of the body and adapted to be lowered into and raised from the bore of the tubing by said member for receiving a well fluid sample, means for sealing off between the tube and said body bore to prevent direct communication between said cylinder and tubing, a conduit for establishing communication between said tubing and the upper and lower ends of the cylinder, two-way valves for controlling the direction of flow of well fluids through the conduit, whereby the well fluids may be conducted alternately to the opposite ends of said cylinder to reciprocate the piston member so as to raise and lower the tube, and means for exhausting said well fluids from the upper and lower ends of the cylinder, said member having an annular passage therein communicating with the tube and closed off by the cylinder wall to prevent the escape of the fluid sample, the passage of the member registering with the outlet of said cylinder only when said member is moved to its lower position for conducting said sample from said tube to said outlet.

8. A sampling aparatus for a flowing well having a flow control assembly mounted upon and in communication with the bore of its tubing including, a tubular body adapted to be connected to the control assembly so as to communicate with the bore of the tubing and having a cylinder formed therein, a plunger slidably mounted within the cylinder, means for conducting the well fluids to and releasing the same from said cylinder for reciprocating the plunger, a tube depending from said plunger and extending through the lower end of the cylinder into the bore of the body so as to be lowered into and raised out of the tubing bore upon reciprocation of the plunger, the tube being of sufficient length to extend below the flow connections of said control assembly when lowered by said plunger for obtaining a representative sample of said well fluids, and means for sealing off between said tube and said body bore to prevent direct communication between said cylinder and tubing bore, the body having a discharge port, the plunger having means for establishing communication between the bore of the tube and the discharge port when said tube is lowered into the tubing bore whereby the sample obtained by the tube may be discharged therefrom.

9. A sampling apparatus as set forth in claim 8 wherein the discharge port of the body is formed in the wall of the cylinder, the means of the plunger for establishing communication between the bore of the tube and said discharge port consisting of an angular duct constantly in communication with said tube bore.

HENRY U. JARRETT.